United States Patent
Burns et al.

(10) Patent No.: US 8,763,777 B2
(45) Date of Patent: Jul. 1, 2014

(54) HYDRAULIC COUPLING

(75) Inventors: Timothy M. Burns, Elbridge, NY (US); Todd Ekonen, Howell, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 962 days.

(21) Appl. No.: 12/520,177

(22) PCT Filed: Dec. 3, 2007

(86) PCT No.: PCT/US2007/024762
§ 371 (c)(1),
(2), (4) Date: Jun. 19, 2009

(87) PCT Pub. No.: WO2008/088474
PCT Pub. Date: Jul. 24, 2008

(65) Prior Publication Data
US 2010/0051407 A1 Mar. 4, 2010

Related U.S. Application Data

(60) Provisional application No. 60/875,714, filed on Dec. 19, 2006.

(51) Int. Cl.
*F16D 43/28* (2006.01)
*F16D 48/02* (2006.01)

(52) U.S. Cl.
USPC ............... 192/85.02; 192/85.24; 192/85.63

(58) Field of Classification Search
USPC ................. 192/85.63, 85.24, 85.02
See application file for complete search history.

(56) References Cited

U.S. PATENT DOCUMENTS

| | | | |
|---|---|---|---|
| 5,967,285 A | 10/1999 | Mohan et al. | |
| 6,076,646 A * | 6/2000 | Burns | 192/85.02 |
| 6,315,097 B1 * | 11/2001 | Burns | 192/35 |
| 6,578,685 B2 * | 6/2003 | Porter | 192/35 |
| 6,578,692 B2 | 6/2003 | Porter | |
| 6,626,787 B2 | 9/2003 | Porter | |
| 6,953,411 B2 | 10/2005 | Burns et al. | |
| 7,051,857 B2 | 5/2006 | Babin | |
| 7,063,198 B2 | 6/2006 | Fratta et al. | |

* cited by examiner

*Primary Examiner* — David D Le
*Assistant Examiner* — Ryan Dodd
(74) *Attorney, Agent, or Firm* — Dickinson Wright PLLC

(57) ABSTRACT

A torque transfer coupling includes first and second rotary members. A transfer clutch operatively connects the first and second rotary members. A piston, disposed in a piston chamber, is actuable to engage the transfer clutch. A hydraulic pump in fluid communication with a sump containing hydraulic fluid has a first pump member fixed for rotation with the first rotary member and a second pump member fixed for rotation with the second rotary member such that relative rotation between the first and the second pump members generates a fluid pumping action. A first flow path supplies hydraulic fluid from the hydraulic pump to the piston chamber. A second flow path supplies hydraulic fluid from the piston chamber to a control valve for regulating the pressure of the hydraulic fluid supplied to the piston chamber. The second flow path includes an aperture extending through the second pump member.

20 Claims, 7 Drawing Sheets

HYDRAULIC COUPLING

CROSS-REFERENCE TO RELATED APPLICATIONS

This application is a 371 U.S. National Stage of International Application No. PCT/US2007/024762, filed Dec. 13, 2007, which claims the benefit of U.S. Provisional Application No. 60/875,714, filed Dec. 19, 2006. The entire disclosure of each of the above applications is incorporated herein by reference.

BACKGROUND

The present invention relates generally to electronically-controlled hydraulic couplings for use in motor vehicle driveline applications for limiting slip and transferring torque between rotary members.

In all wheel drive applications, hydraulic couplings have been used to automatically control the transfer of drive torque from a driven member to a non-driven member in response to speed differentiation therebetween. In limited slip applications, such as used in association with a differential in an axle assembly, a full-time transfer case, or a transaxle, hydraulic couplings have been used to limit slip and bias the torque split between two rotary members. Examples of known hydraulic couplings which are adaptable for such driveline applications include viscous couplings, geared traction units, and electronically-controlled, hydraulically-actuated friction clutches generally similar to those shown and described in U.S. Pat. Nos. 5,148,900, 5,358,454, 4,649,459, 5,704,863, 5,779,013, 6,051,903, 6,578,685 and 6,953,411.

In response to increased consumer demand for motor vehicles with traction control systems, hydraulic couplings are currently being used in a variety of driveline applications. Such hydraulic couplings rely on hydromechanics and pressure-sensitive valve elements to passively respond to a limited range of vehicle operating conditions. These hydraulic couplings are susceptible to improvements that enhance their performance, such as a more controlled response to a wider range of vehicle operating conditions. With this in mind, a need exists to develop improved hydraulic couplings that advance the art.

SUMMARY

A torque transfer coupling for use in a motor vehicle driveline includes first and second rotary members. A transfer clutch operatively connects the first and second rotary members. A piston, disposed in a piston chamber, is actuable to engage the transfer clutch. A hydraulic pump in fluid communication with a sump containing hydraulic fluid has a first pump member fixed for rotation with the first rotary member and a second pump member fixed for rotation with the second rotary member such that relative rotation between the first and the second pump members generates a fluid pumping action. A first flow path supplies hydraulic fluid from the hydraulic pump to the piston chamber. A second flow path supplies hydraulic fluid from the piston chamber to a control valve for regulating the pressure of the hydraulic fluid supplied to the piston chamber. The second flow path includes an aperture extending through the second pump member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
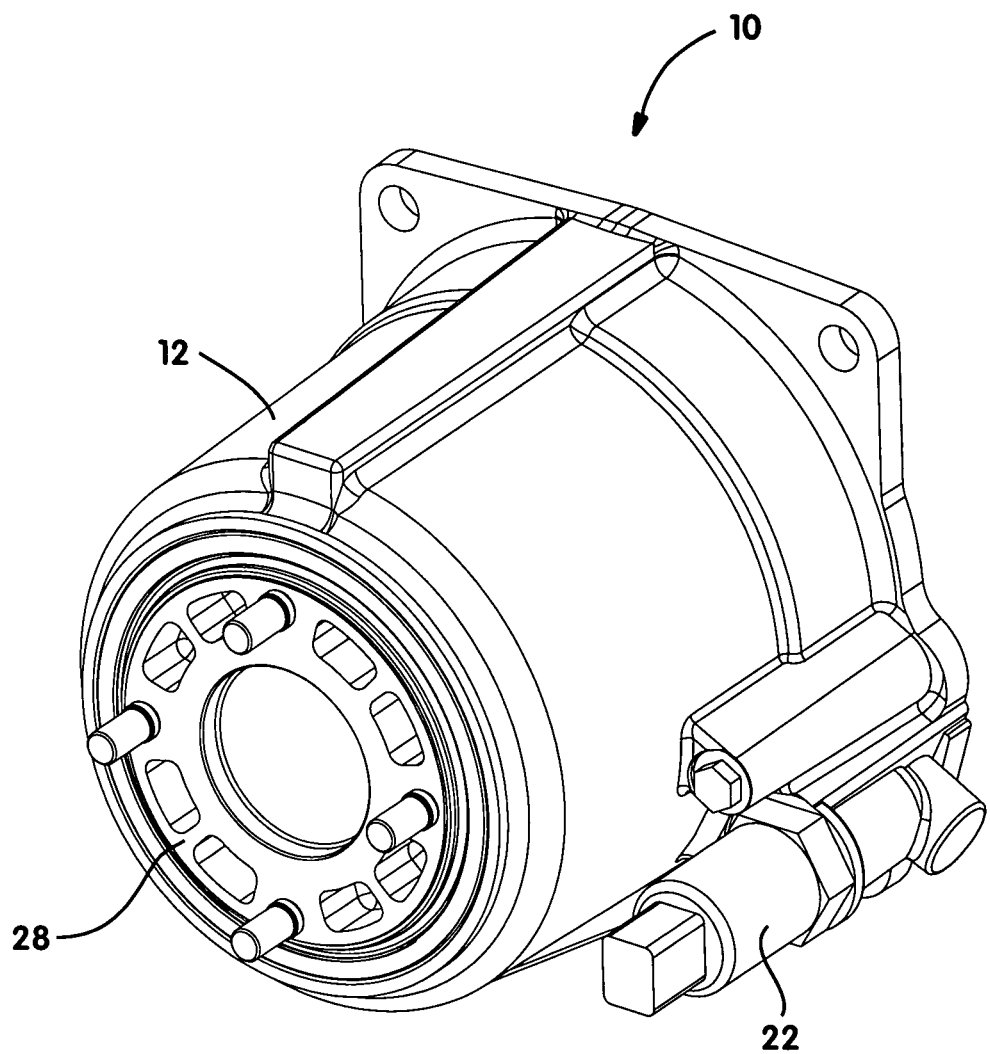
FIG. 1 is a perspective view illustrating a hydraulic coupling according to the present disclosure.
Figure 2A:
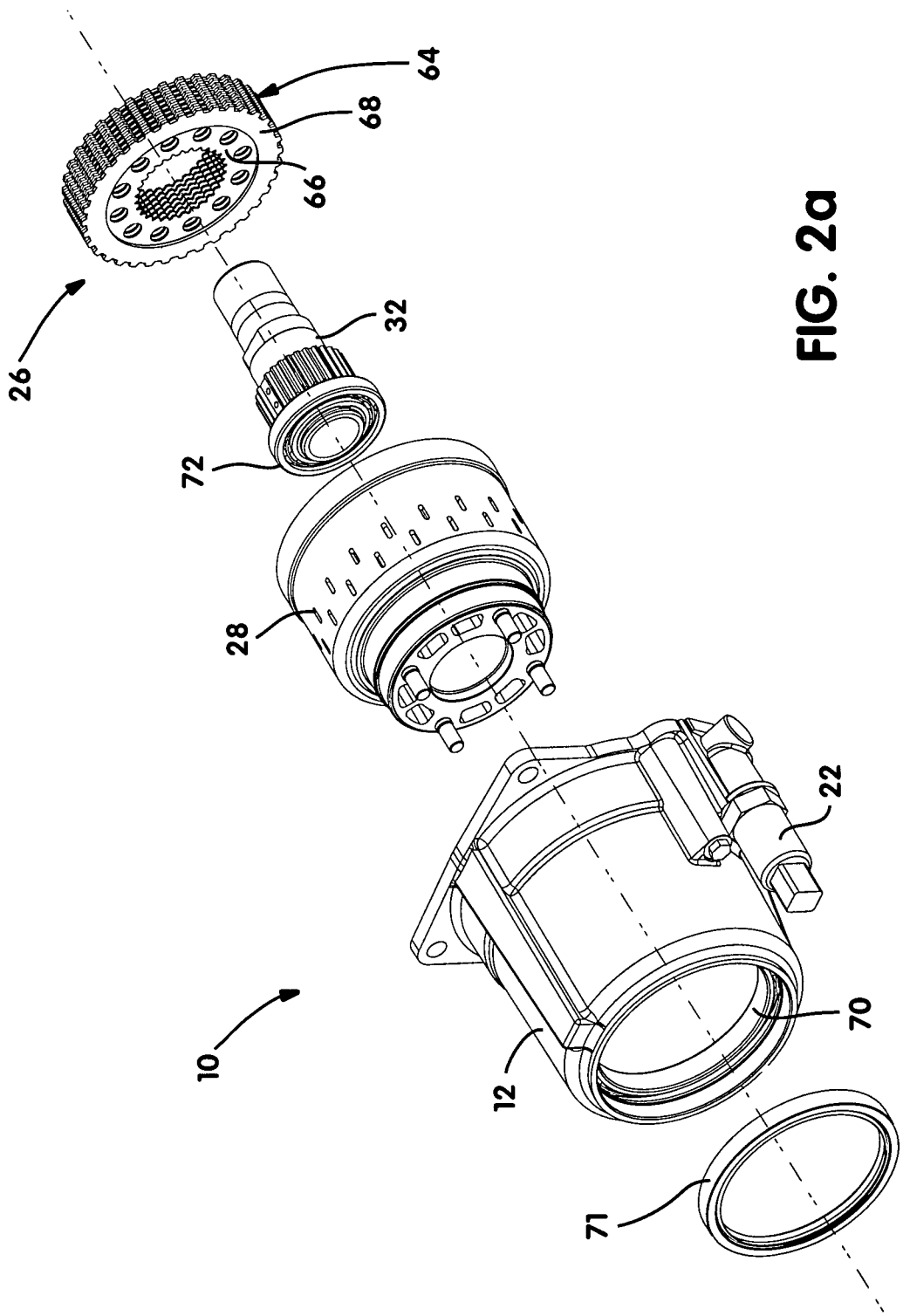
FIGS. 2a and 2b are exploded perspective views depicting the components of the hydraulic coupling shown in FIG. 1.
Figure 2B:
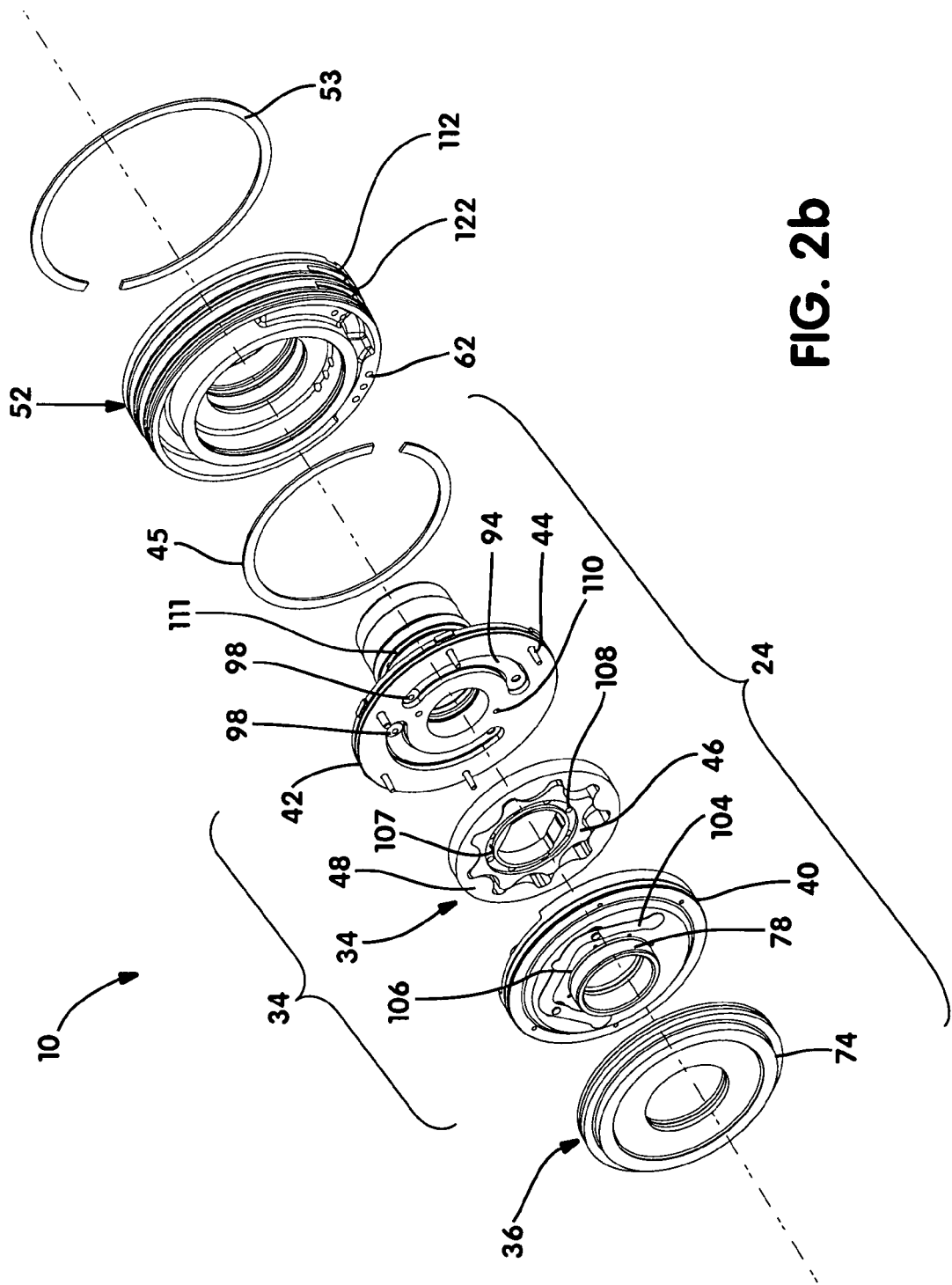

The following description is merely exemplary in nature and is not intended to limit the present disclosure, application, or uses. It should be understood that throughout the drawings, corresponding reference numerals indicate like or corresponding parts and features.

In general, the present invention is directed to an actively-controlled hydromechanical limited slip and torque transfer apparatus, hereinafter referred to as a hydraulic coupling. The hydraulic coupling is well-suited for vehicular driveline applications requiring torque transfer or slip limiting control between a pair of rotary members. Driveline applications for the hydraulic coupling include, but are not limited to, limited slip axle differentials, power take-offs and in-line couplings for all-wheel drive vehicles, on-demand couplings and limited slip differentials in four-wheel drive transfer cases, and limited slip differentials in transaxles.

Referring initially to FIGS. 1-4 of the drawings, a hydraulic coupling according to a preferred embodiment of the present invention is generally identified with reference numeral 10. Hydraulic coupling 10 is located in a driveline apparatus having a housing 12 and is operatively coupled between a first rotary member, hereinafter referred to as first shaft 14, and second rotary member, hereinafter referred to as second shaft 16. Shafts 14 and 16 are rotatable relative to one another. As will become apparent, hydraulic coupling 10 is controlled by an electronic control module 20 for automatically controlling torque transfer and speed differentiation between shafts 14 and 16. Electronic control module 20 may monitor vehicle system information and hydraulic coupling information including, but not limited to, wheel speed, throttle position, steering angle, yaw rate, oil sump temperature, oil outlet temperature and clutch pressure, as provided by vehicle sensors 21. Other information available on the CAN database may also be used. Control module 20 controls a flow control valve assembly 22 associated with hydraulic coupling 10. Control valve assembly 22 may be a pulse-width modulated (PWM) valve.

In general, hydraulic coupling 10 comprises two portions: an actuator assembly 24, and a transfer clutch 26 for transferring drive torque from a faster rotating shaft to a slower rotating shaft in response to speed differentiation therebetween. Transfer clutch 26 is a hydraulically-actuated multi-plate clutch assembly operably coupled between first shaft 14 and second shaft 16. Transfer clutch 26 includes a drum 28 fixed for rotation with first shaft 14 and a hub 32 fixed for rotation with second shaft 16.

Actuator assembly 24 includes a hydraulic pump 34 and a piston assembly 36. Hydraulic pump 34 includes a pump housing 40 and a cover 42 secured thereto via fasteners 44 or other methods. Pump housing 40 and cover 42 are fixed for rotation with drum 28 and first shaft 14. The axial position of cover 42 is maintained by a ring 45. Preferably, hydraulic pump 34 is a bi-directional gerotor pump having a first or inner toothed pump member 46 fixed (i.e., keyed) for rotation with hub 32 and a second or outer toothed pump member 48 positioned within a recess 50 formed in pump housing 40. A valve body 52 is fixed to housing 12 by a ring 53. A bearing 54 rotatably supports cover 42 within valve body 52. With such an arrangement, relative rotation between first shaft 14 and second shaft 16 results in a pumping action which draws fluid from an inlet reservoir 56 on the suction side of pump 34 to an outlet reservoir 58 on the discharge side of pump 34. Inlet reservoir 56 is in fluid communication with a fluid-filled sump 60 via a sump passage 62 formed in valve body 52. To facilitate pumping action in both directions of rotation, hydraulic pump 34 includes suitable one-way check valves similar to the arrangement shown in commonly-owned U.S. Pat. Nos. 6,041,903 and 6,578,685 which are incorporated by reference Transfer clutch 26 includes a clutch pack 64 having a plurality of inner clutch plates 66 fixed (i.e., splined) to hub 32 that are interleaved with a plurality of outer clutch plates 68 fixed (i.e., splined) to drum 28. Drum 28 is rotatably supported within housing 12 by a bearing 70. A seal 71 is pressed into an aperture formed in housing 12 and sealingly engages drum 28. In addition, hub 32 is rotatably supported within drum 28 by a bearing 72.

Piston assembly 36 includes an actuation member or piston 74 disposed in a piston chamber 76. Piston chamber 76 is defined by a cylindrical segment 78 of pump housing 40 and an inner surface 80 of drum 28. Piston 74 is supported for axial sliding movement within piston chamber 76 relative to interleaved multi-plate clutch pack 64 for selectively applying a compressive clutch engagement force thereon, thereby transferring drive torque from first shaft 14 (via drum 28) to second shaft 16 (via hub 32) or vise versa.

Figure 3:
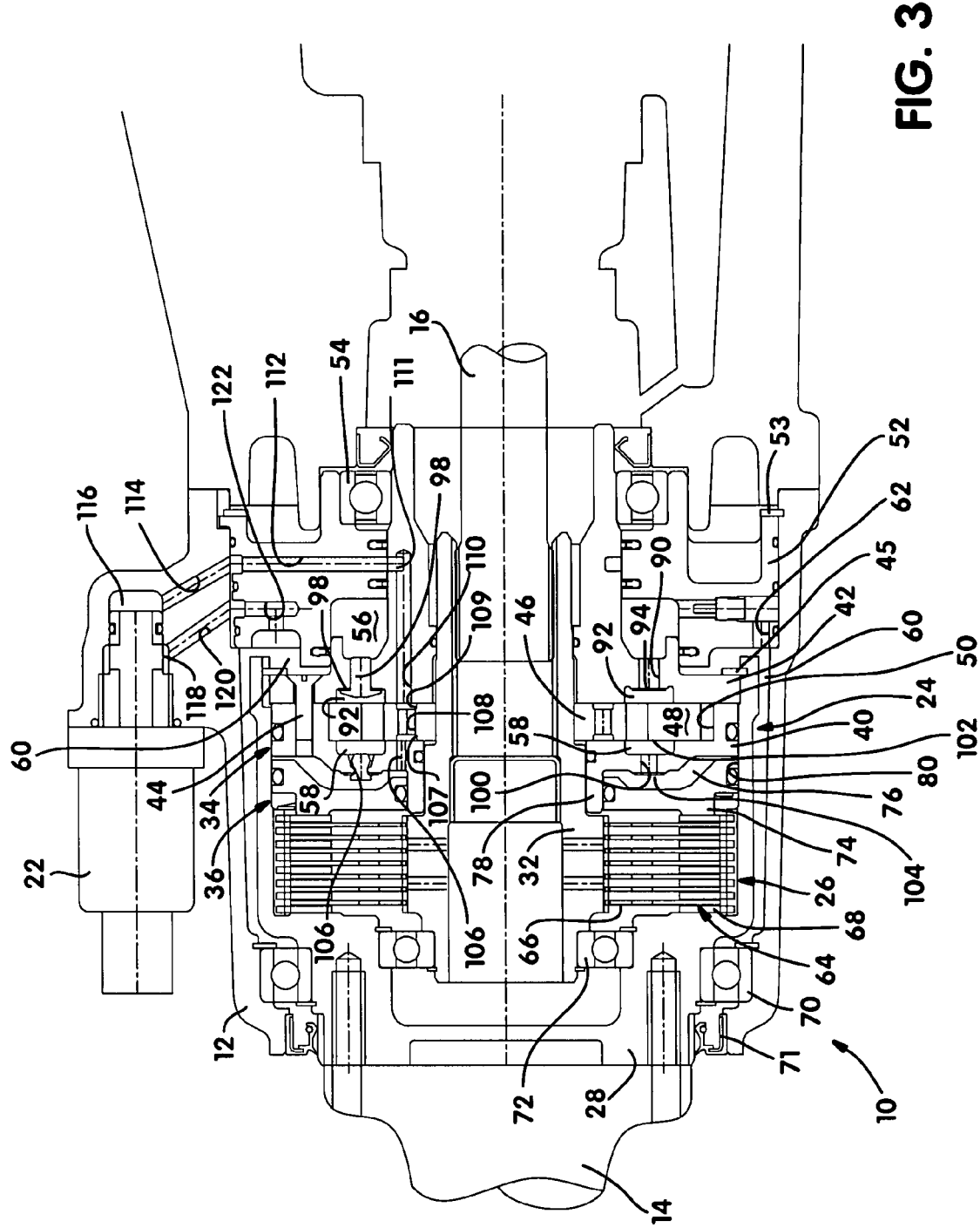
FIG. 3 is a sectional view illustrating the hydraulic coupling operatively coupled between first and second rotary members.
Figure 4:
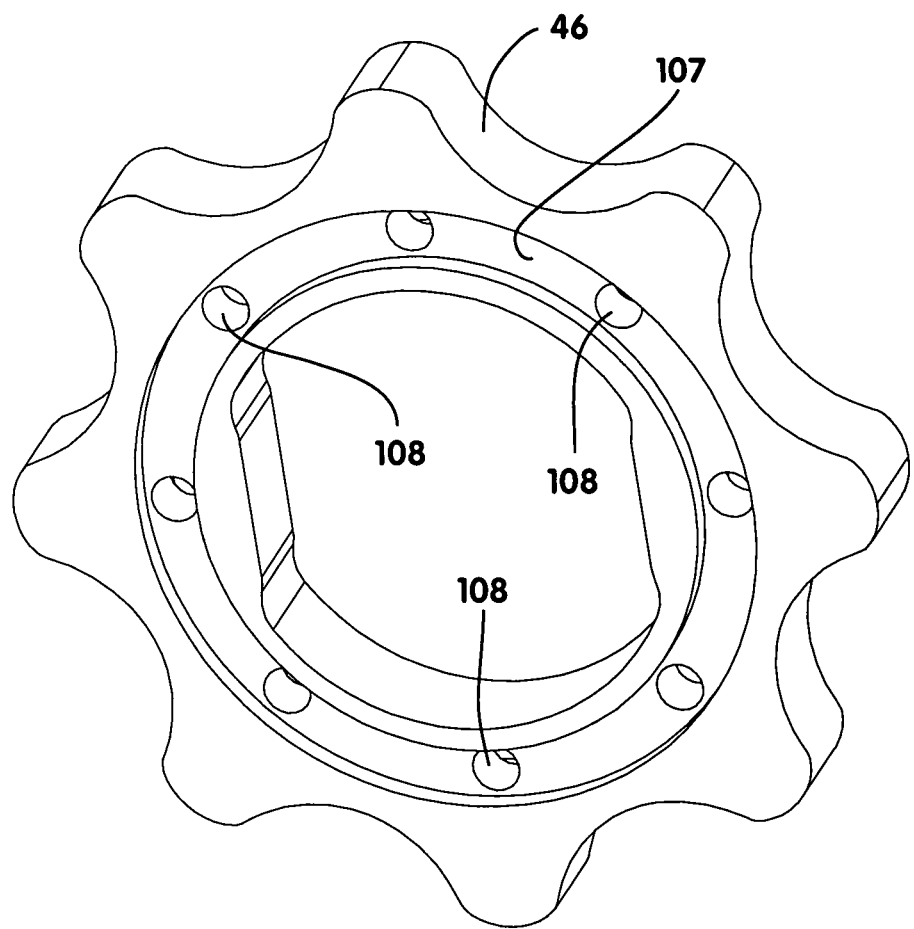
FIG. 4 is a perspective view of a first toothed pump member of the hydraulic coupling of the present disclosure.
Figure 5:
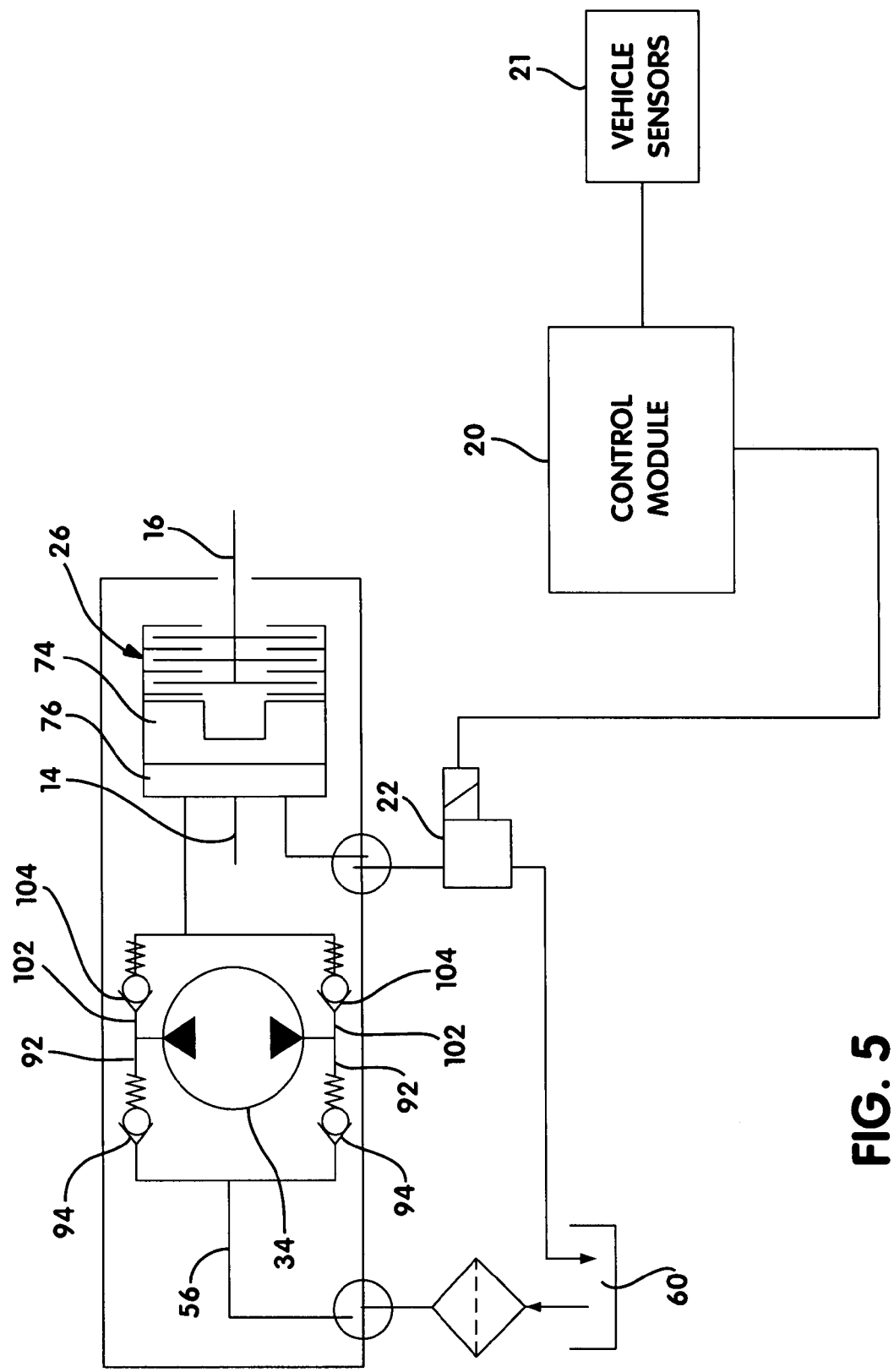
FIG. 5 is a schematic illustration of a hydraulic circuit associated with the hydraulic coupling of FIG. 1.

As most clearly shown in FIGS. 3 and 5, sump 60 is in communication with inlet reservoir 56 via sump passage 62 formed in valve body 52. A pair of first apertures extending through cover 42, hereinafter referred to as first over passages 90, communicate with inlet reservoir 56 and a pair of pump inlet ports 92. A pair of inlet check valves 94 allows fluid to flow in one direction from inlet reservoir 56 to pump inlet ports 92 but restricts fluid flow in the reverse direction. One-way inlet check valves 94 move between "open" and "closed" positions in response to the direction of pumping action generated by pump 34. Rotation of the pump components in a first direction acts to open one of inlet check valves 94 and close the other for permitting fluid to be drawn from inlet reservoir 56. The opposite occurs in the case of pumping in the reverse rotary direction, thereby assuring bi-directional operation of pump 34. Inlet check valves 94 are preferably reed-type valves fastened by rivets 92 to cover 42. Inlet check valves 94 are of the normally-closed type.

A pair of first apertures extending through pump housing 40, hereinafter referred to as first pump housing passages 100, communicate with a pair of pump outlet ports 102 and with piston chamber 76. A pair of outlet check valves 104 allow fluid to flow from pump outlet ports 102 through first pump housing passages 100 and into piston chamber 76. As before, the direction of pumping action establishes which of outlet check valves 104 is in its "open" position and which is in its "closed" position to deliver pump pressure to piston chamber 76. Upon cessation of pumping action, both outlet check valves 104 return to their closed position to maintain fluid pressure in piston chamber 76. Thus, outlet check valves 104 are also of the normally-closed variety.

A plurality of second apertures extending through pump housing 40, hereinafter referred to a second pump housing passages 106, communicate with piston chamber 76. Passages 106 may be integrally formed within pump housing 40 without machining. Passages 106 are in communication with a first groove 107 formed in first toothed pump member 46. A plurality of apertures, hereinafter referred to as pump member passageways 108, are aligned with first groove 107 and extend through the thickness of first toothed pump member 46. A second groove 109 is formed on the opposite side of first toothed pump member 46 as first groove 107. Passageways 108 communicate with second groove 109. First toothed pump member 46 may be formed from powdered metal such that the teeth, first groove 107, second groove 109 and pump member passageways 108 may be formed during powdered metal processing such that subsequent machining is not required. A pair of second apertures formed in cover 42, hereinafter referred to as second cover passages 110, communicate with second groove 109. A cover groove 111 is formed on cover 42 to allow fluid communication between second cover passage 110 and a first valve body passage 112 extending through valve body 52. It should be appreciated that grooves 107 and 109 may alternatively be formed on either pump housing 40 or cover 42.

A valve inlet passage 114 extends through housing 12 and is in communication with first body valve passage 112 and a valve inlet 116. A valve outlet 118 is in communication with a valve outlet passage 120 extending through housing 12. A second valve body passage 122 communicates with valve outlet passage 120 and sump 60. Fluid may be selectively allowed to pass from valve inlet 116 to valve outlet 118 by actuation of control valve assembly 22.

The amount of drive torque transferred between first shaft 14 and second shaft 16 is proportional to the magnitude of the clutch engagement force exerted by piston 74 on clutch pack 64. The magnitude of the clutch engagement force is a function of the fluid pressure within piston chamber 76. The magnitude of the fluid pressure delivered to piston chamber 76 is determined by control valve assembly 22 which has a movable valve element, the position of which is controlled by an electric control signal generated by control module 20. The remaining fluid passes through valve outlet passage 120 and second valve body passage 122 to sump 60. The control pressure may be closely controlled due to the use of control valve assembly 22.

As shown in FIGS. 1-4, hydraulic coupling 10 provides a first flow path for supplying hydraulic fluid from sump 60 to piston chamber 76 and a second flow path for supplying hydraulic fluid from piston chamber 76 to valve inlet 116 of control valve 22. The first flow path includes sump passage 62, inlet reservoir 56, first cover passages 90, pump inlet ports 92, hydraulic pump 34, pump outlet ports 102, outlet reservoir 58 and first pump housing passages 100. The second flow path includes second pump housing passages 106, first groove 107, pump member passageways 108, second groove 109, second cover passages 110, first valve body passage 112 and valve inlet passage 114.

Figure 6:
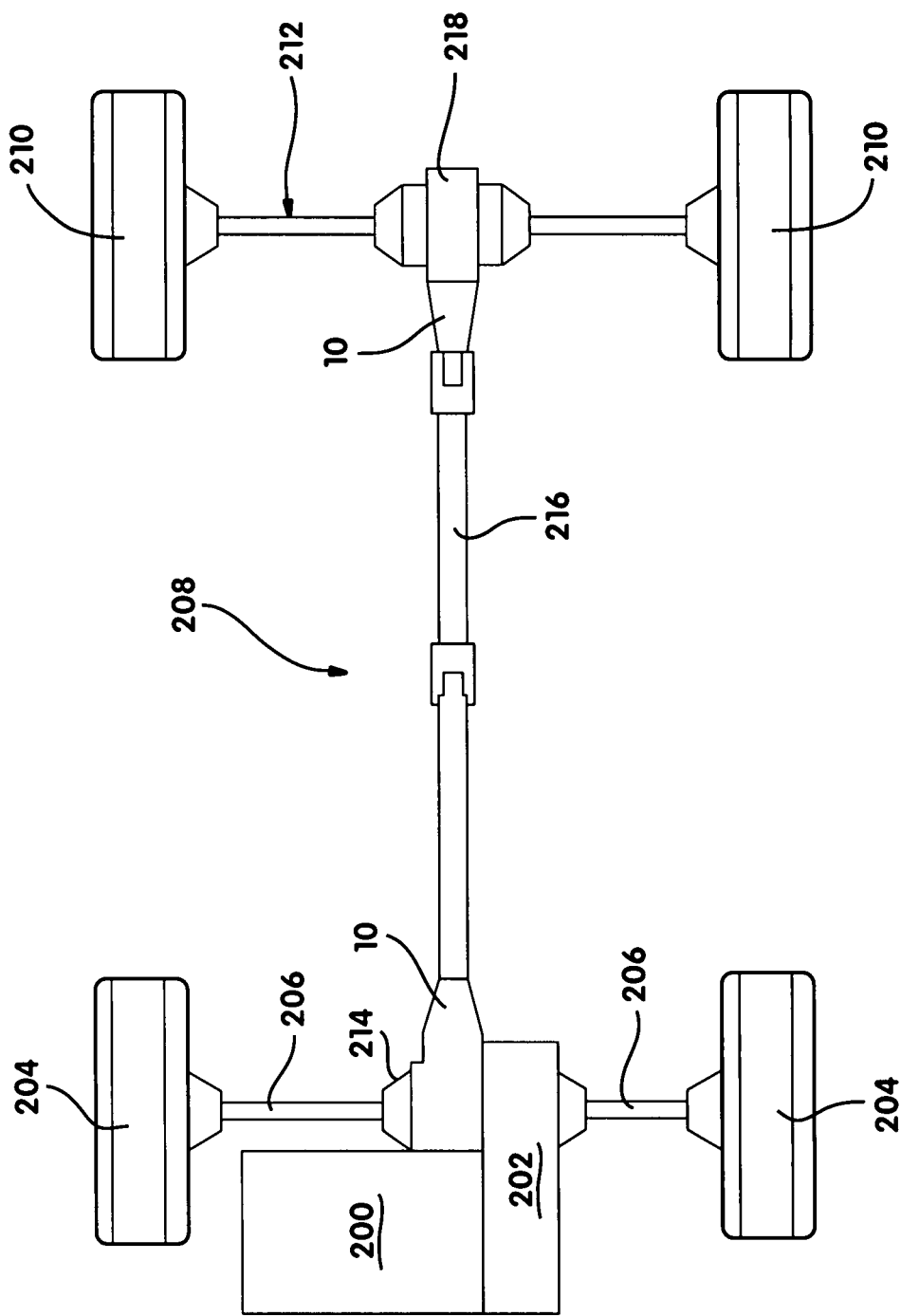
FIG. 6 is a schematic of a vehicle equipped with the hydraulic coupling of the present disclosure.

Referring to FIG. 6, an all-wheel drive vehicle is shown to include an engine 200, a front wheel drive transaxle 202 for delivering drive torque from engine 200 to front wheels 204 via front axle-shafts 206, and a power take-off driveline 208 for automatically delivering drive torque to rear wheels 210 via a rear axle assembly 212 when slip occurs across hydraulic coupling 10 when control module 20 determines to transfer torque. Driveline 208 includes a power take-off unit or PTU 214 which is driven by an output of transaxle 202 and a propshaft 216 delivering power from PTU 214 to a final drive unit 218 of rear axle assembly 212. Hydraulic coupling 10 is shown in both of two optional positions. In the first position, the coupling is located for progressively transferring power from PTU 214 to propshaft 216. In the second position, the coupling is located for progressively transferring power from propshaft 216 to final drive unit 218. Obviously, only one coupling is required but is shown in both locations to clearly indicate the various options made available with coupling 10.

Furthermore, the foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A torque transfer coupling for use in a motor vehicle driveline, the coupling comprising:
    first and second rotary members;
    a transfer clutch operatively connected between said first and second rotary members;
    a piston disposed in a piston chamber and actuable to engage said transfer clutch;
    a hydraulic pump having a pump inlet in fluid communication with a sump containing hydraulic fluid and a pump outlet in fluid communication with said piston chamber, said hydraulic pump having a first pump member fixed for rotation with said first rotary member and a second pump member fixed for rotation with said second rotary pump member, wherein said first pump member and said second pump member are disposed in eccentric engagement, with said first pump member disposed inward of said second pump member, to define a rotating gap therebetween such that relative rotation between said first and second pump members generates a fluid pumping action for communicating hydraulic fluid from said pump inlet to said pump outlet;
    a control valve for regulating the pressure of said hydraulic fluid within said piston chamber, said control valve having a valve inlet and a valve outlet in fluid communication with said sump;
    a first flow path extending at least in part through said hydraulic pump via said rotating gap defined between said first pump member and said second pump member for communicating said hydraulic fluid from said pump inlet to said pump outlet and said piston chamber; and
    a second flow path extending at least in part through said hydraulic pump including at least one pump member passageway extending through said first pump member for communicating said hydraulic fluid from said piston chamber to said valve inlet of said control valve.

2. The torque transfer coupling of claim 1 wherein said hydraulic pump includes a pump housing assembly having a pump housing and a cover defining a cavity enclosing said first pump member and said second pump member.

3. The torque transfer coupling of claim 2 wherein said first flow path includes a first pump housing passage extending through said pump housing and said second flow path includes a second pump housing passage extending through said pump housing.

4. The torque transfer coupling of claim 3 wherein said second pump housing passage is in fluid communication with said pump member passageway extending through said first pump member.

5. The torque transfer coupling of claim 4 wherein said first flow path includes a first cover passage extending through said cover and said second flow path includes a second cover passage extending through said cover.

6. The torque transfer coupling of claim 5 further including a valve body having a first valve body passage in fluid communication with said first cover passage and a second valve body passage in fluid communication with said second cover passage wherein said first flow path includes said first valve body passage and said second flow path includes said second valve body passage.

7. The torque transfer coupling of claim 5 wherein said second flow path further includes a first groove formed on one side of said first pump member and a second groove formed on an opposite side of said first pump member, wherein said first groove is in fluid communication with said pump member passageway of said first pump member and said second pump housing passage, and wherein said second groove is in fluid communication with said pump member passageway of said first pump member and said second cover passage.

8. The torque transfer coupling of claim 1 wherein said second rotary member includes a drum portion drivingly engaged with a plurality of first clutch plates.

9. The torque transfer coupling of claim 8 wherein said transfer clutch includes a hub fixed for rotation with a plurality of second clutch plates interleaved with said first clutch plates.

10. The torque transfer coupling of claim 9 wherein said hub sealingly engages a pump housing and a cover, said pump housing and said cover retaining said first pump member and said second pump member.

11. The torque transfer coupling of claim 8 wherein said drum portion includes an inner surface defining a portion of said piston chamber.

12. The torque transfer coupling of claim 1 further including a control module for controlling actuation of said control valve in response to a signal from a vehicle sensor, wherein actuation of said control valve is operable to regulate flow of said hydraulic fluid from said valve inlet of said control valve to said valve outlet of said control valve.

13. The torque transfer coupling of claim 12 wherein regulation of the flow of said hydraulic fluid from said valve inlet of said control valve to said valve outlet of said control valve is operable to regulate the fluid pressure within said piston chamber.

14. A torque transfer coupling for use in a motor vehicle driveline, the coupling comprising:
    first and second rotary members;
    a transfer clutch operatively connected between said first and second rotary members;
    a piston disposed in a piston chamber and actuable to engage said transfer clutch;
    a hydraulic pump having a pump inlet in fluid communication with a sump containing hydraulic fluid, a pump outlet in fluid communication with said piston chamber, a pump housing fixed for rotation with said first rotary member, a first toothed pump member fixed for rotation with said second rotary member, and a second toothed pump member positioned therebetween, wherein said first toothed pump member and said second toothed pump member are disposed in interlocking eccentric engagement, with said first toothed pump member disposed inward of said second toothed pump member, to define a rotation gap therebetween such that relative rotation between said first and second rotary members generates a fluid pumping action for communicating hydraulic fluid from said pump inlet to said pump outlet;

a control valve for regulating the pressure of said hydraulic fluid within said piston chamber, said control valve having a valve inlet and a valve outlet in fluid communication with said sump; and a flow path for communicating said hydraulic fluid from said pump inlet and through said rotating gap between said first and second toothed pump members to said pump outlet and through said piston chamber and to said valve inlet of said control valve, said flow path including a pump member passageway extending through said first toothed pump member.

15. The torque transfer coupling of claim 14 wherein said pump member passageway extending through said first toothed pump member extends substantially parallel to an axis of rotation of said second rotary member.

16. The torque transfer coupling of claim 14 wherein said flow path includes a first passage extending through said pump housing interconnecting said pump outlet and said piston chamber as well as a second passage extending through said pump housing interconnecting said piston chamber and said valve inlet of said control valve via said pump member passageway extending through said first toothed pump member.

17. The torque transfer coupling of claim 16 wherein said pump member passageway extending through said first toothed pump member is positioned radially inward of said first passage extending through said pump housing.

18. The torque transfer coupling of claim 17 further including a housing rotatably supporting said first rotary member and further including a valve body fixed to said housing, said valve body rotatably supporting said pump housing and including a valve body passage forming a portion of said flow path interconnecting said pump member passageway to said valve inlet of said control valve.

19. The torque transfer coupling of claim 18 wherein said control valve is mounted outside of said housing.

20. The torque transfer coupling of claim 19 wherein said hydraulic fluid is contained within a sump located within said housing.

* * * * *